United States Patent [19]

Krist

[11] Patent Number: 4,843,892
[45] Date of Patent: Jul. 4, 1989

[54] METHOD FOR DETERMINING THE EYE AND/OR HEAD POSITION OF A VEHICLE-USER AND ARRANGEMENT FOR CARRYING OUT THE METHOD

[75] Inventor: Peter Krist, Augsburg, Fed. Rep. of Germany

[73] Assignee: Bayerische Motoren Werke Aktiengesellschaft, Munich, Fed. Rep. of Germany

[21] Appl. No.: 182,431

[22] Filed: Apr. 18, 1988

[30] Foreign Application Priority Data

Apr. 18, 1987 [DE] Fed. Rep. of Germany ....... 3713218

[51] Int. Cl.⁴ .......................................... G01D 21/00
[52] U.S. Cl. .................................. 73/865.4; 73/432.1
[58] Field of Search ................. 73/865.9, 432.1, 866.4, 73/865.4

[56] References Cited

U.S. PATENT DOCUMENTS 4,742,720 5/1988 Storck .................................. 73/865.9

FOREIGN PATENT DOCUMENTS 3138712 4/1982 Fed. Rep. of Germany .
3410263 9/1985 Fed. Rep. of Germany .
164916 12/1981 Japan .................................. 73/865.4

Primary Examiner—Tom Noland
Attorney, Agent, or Firm—Barnes & Thornburg

[57] ABSTRACT

In a method for determining the eye and/or head position of a vehicle-user, the position is determined on the basis of the adjusting parameters of a rear view mirror. The position can be determined therewith without difficulties and without special expenditures from the further design or constructive conditions of the vehicle and can be transmitted to a suitable device for the respective application, such as virtual indications or antiglare protection devices.

6 Claims, 4 Drawing Sheets

METHOD FOR DETERMINING THE EYE AND/OR HEAD POSITION OF A VEHICLE-USER AND ARRANGEMENT FOR CARRYING OUT THE METHOD

BACKGROUND AND SUMMARY OF THE INVENTION

The present invention relates to a method for determining the eye- and/or head-position of a vehicle-user as well as to an arrangement pertaining thereto.

Use of such a method constitutes a basis for driver increase of the comfort and is indispensable as safety feature for vehicles. It is of particular significance in conjunction with virtual indications, or as a basis of an anti-glare protection installation.

With virtual indications, a virtual image containing the corresponding information is imaged to the vehicle-user by way of a corresponding optical device, for example in the windshield. The creation can take place with the assist of conventional optical devices such as glass lenses or the like, or also with the assist of holographic elements.

The anti-glare protection installation can be constructed in different ways and should serve the purpose of controlling stray light from oncoming vehicles, or of other light sources in the beam path proceeding toward the vehicle-user by corresponding darkening of the windshield, or by control of additional anti-glare protection elements. In every application the corresponding indications, respectively installations, can then be effectively controlled and without undesired side effects.

A method and arrangement of the aforementioned type are known from the DE-OS 31 38 712, in which the desired position is calvculated from the position of the parts of a vehicle seat. For that purpose, several values, for example: the longitudinal position of the seat, the inclination of the backrest and the height position of the headrest, are required, from which the desired position is determined with the aid of a computer. This method is costly, because at least three values are required in connection therewith. It is also inaccurate, because at least one of the values, namely that for the position of the headrest is not correct by reason of frequently false adjustments.

The present invention is concerned with providing a method of the aforemtnioned type, which enables in a particularly simple manner, a good determination of the eye and/or head position of a vehicle-user as well as providing a simple arrangement for carrying out this method.

The underlying problems are solved according to the present invention in that the affected position is determined on the basis of the adjusting parameters of a rear view mirror.

The rear view mirror is so positioned prior to, or during the use of the vehicle, by the driver or by associated adjusting electronics that it operates efficiently. This means, it is so adjusted that the rear image projected by the same is optimal for the vehicle-user. As an adjusting assist for the driver, a mark may be integrated into the rear mirror whereby in the case of an interior rear view mirror, for example, small cross hairs thereon are with a correct adjustment, made to coincide with a second mark in the rear window.

A determining beam results from the adjusting parameters of the rear view mirror by reason of the optical properties of the mirror and the beam is aligned with the eyes of the vehicle-user.

The seat center plane resulting from the arrangement of the vehicle seat, serves as further determining magnitude for the eye position. The seat center plane extends in the longitudinal direction of the vehicle and is disposed perpendicularly to the longitudinal and vertical axis of the vehicle. However, the position of this plane is known beforehand and does not depend on the respective vehicle-user. It is rather a constructionor design element of the vehicle, which for example, is predetermined by the position of the seat rails. In the alternative thereto, the adjustment of a further rear view mirror may be used as further determining factor.

Improvements of the method in accordance with the present invention are possible in various ways. Thus, the use of the adjusting parameters of an interior rear view mirror contains a particularly accurate indication concerning the eye position, because the interior rear view mirror normally possesses a greater magnification, respectively lesser reduction, than an outside rear view mirror and it is adjusted accurately to the respective eye position of the vehicle-user.

The alternative or additionally provided use of the parameters of an outside rear view mirror, offers in contrast thereto the advantage that such outside rear view mirrors are normally adjusted by means of motors and that from these adjustment parameters of the outside rear view mirror, an exact determination of the eye positio can be derived without additional use of special sensors for the adjustment of the outside rear view mirror.

As already mentioned above, the parameters from which the desired position can be determined by reason of simple geometric considerations, can be obtained with the assistance of possibly already present control elements and sensors for equipment components of the motor vehicle, such as outside rear view mirror and vehicle seat. However, it is also possible without these present devices to obtain the desired informations with low expenditures. For that purpose a potentiometer with two degrees of freedom which is very troublefree, can be used to pick up the position of the respective rear view mirror and transmits the same to a suitable control unit for the respective application.

With such a control, the desired adjusting values for the respective parts, such as for example, the height adjustment of a safety belt deflection point, the adjustment of air guide nozzles of a heating/air conditioning system, etc., as also disclosed, for example, in the aforementioned DE-OS No. 31 38 712, can be taken or fetched from tables and can be converted into corresponding predeterminations for adjusting these parts.

It is also possible to undertake a vehicle-user identification on the basis of the adjusting parameters of the rear view mirror and to fetch corresponding stored adjusting values analogous to the known memory devices. Compared to such known arrangements, the possibility of errors from an individual manual selection of the stored adjusting values can then be avoided.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
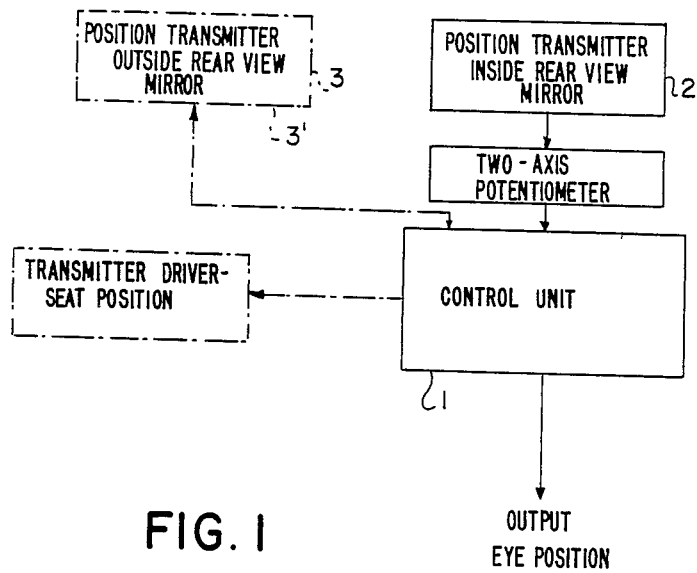
FIG. 1 is a schematic block diagram of one embodiment of an arrangement for determining the eye and/or head position of a vehicle-user in accordance with the present invention.

Referring now to the drawing, and more particularly to FIG. 1, the adjustment of an interior rear view mirror (not shown) as regards its two adjusting degrees of freedom is fed to a central control unit 1 with the assistance of a position transmitter or pick-up 2 (not illustrated in detail). Such a position transmitter or pick-up may involve for example, a two-axial potentiometer. By reason of the geometric and constructive conditions and the optical properties of a mirror, the eye, respectively head position, of the vehicle-user can be derived therefrom without difficulty. The position of an outside rear view mirror which is determined in an analogous manner, may additionally be fed as input to the control unit 1 for the desired position of the eye, respectively head, of the vehicle-user with the aid of separate position transmitters of pick-ups 3.

The control unit 1 now determines on the basis of a stored value, respectively predetermined algorithms, the adjusting values for parts of the motor vehicle which may be such different parts as air guide nozzles or vehicle seat parts. It is also possible to adjust the position of a further outside rear view mirror or both outside rear view mirrors. In that case, only the position of the inside rear view mirror determined by means of the position transmitter 2 is used and the position of the outside rear view mirror(s) is adjusted correspondingly. A schematically indicated transmitter or pick-up 3' for one or both outside rear view mirrors serves that purpose. The stored values may involve values which are predetermined on the basis of driver-independent tables driver-individually, which are retained driver-individually within the scope of a preceding learning or operating mode.

The consideration of the actual position or of the position to be adjusted of the outside rear view mirror depends on whether a further determining magnitude is used for the eye, respectively head, position. This may involve, for example, the seat center plane m resulting from the arrangement of the vehicle seat, which is fixed by the position of the seat rail of the vehicle seat. If this constructive and driver-independent feature is utilized, then the adjustment of the outside rear view mirror or mirrors can be predetermined (3') from the positio of the inside rear view mirror (position pick-up 2). Otherwise, the head and/or eye position of the vehicle-user can be determined only from the adjustment of the outside rear view mirror or mirrors 3.

Figure 2:
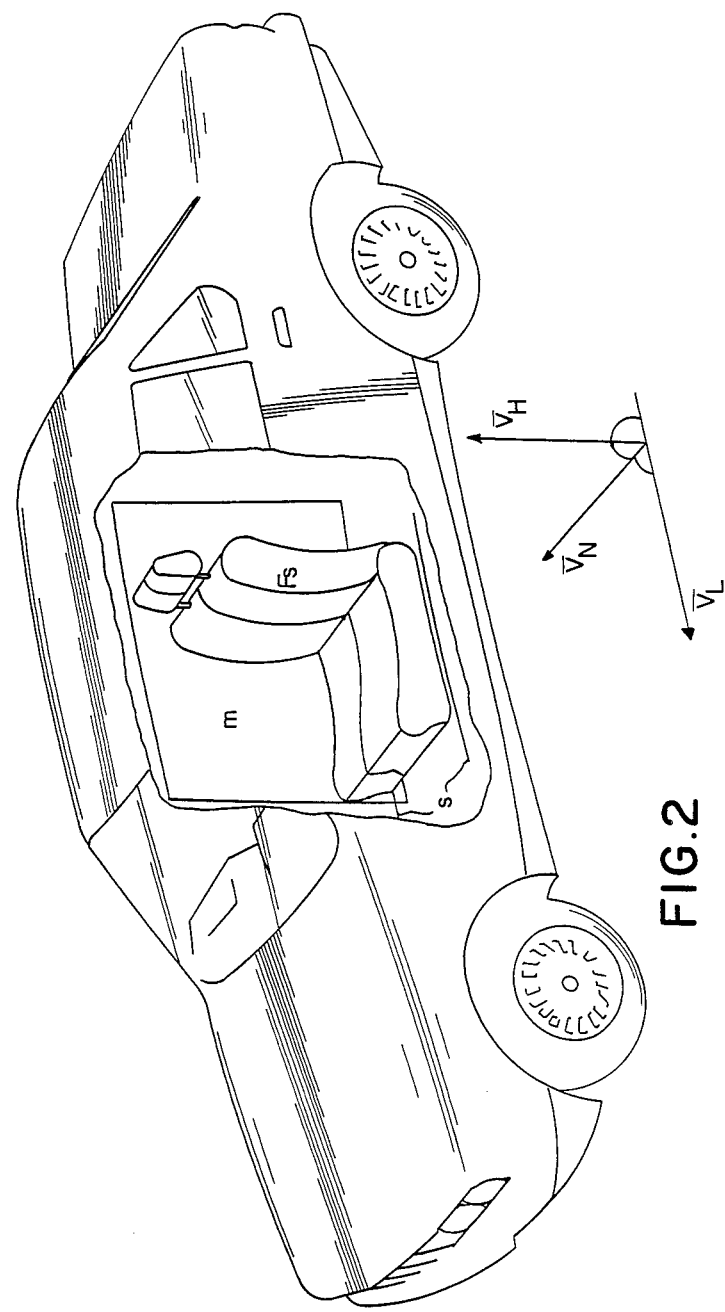
FIGS. 2-4 are schematic views for explaining the geometric conditions of significance within the scope of the present invention.

This center plane m is shown in FIG. 2 and extends through the center line of two seat rails s of the vehicle seat Fs. It is subtended by the vectors $V_H$, $V_L$ for the vertical axis and longitudinal axis of the motor vehicle and includes the normal $V_N$.

If, by contrast, the position of the seat center plane m is not taken into consideration, then the consideration of the position, for example, of the outside rear view mirror is required. The position of the eyes or the head or the vehicle-user can be derived from the position of the two mirrors utilizing a system analogous to the known cross bearing system.

Figure 3:
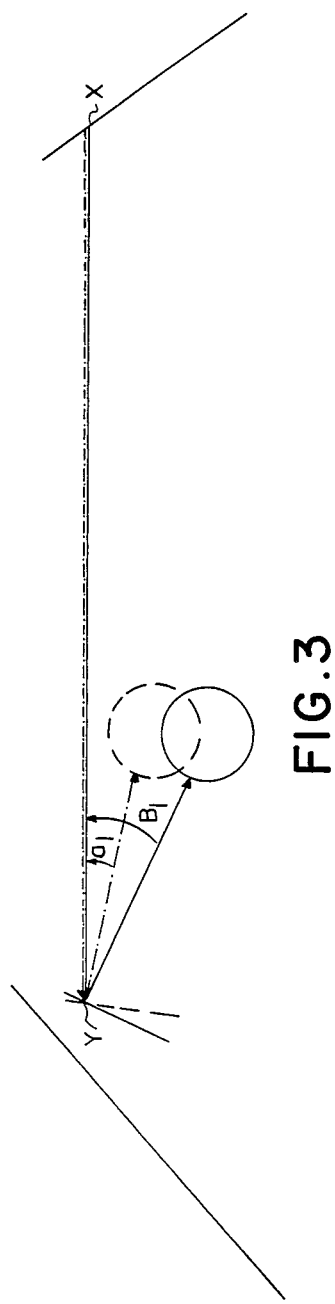
Figure 4:
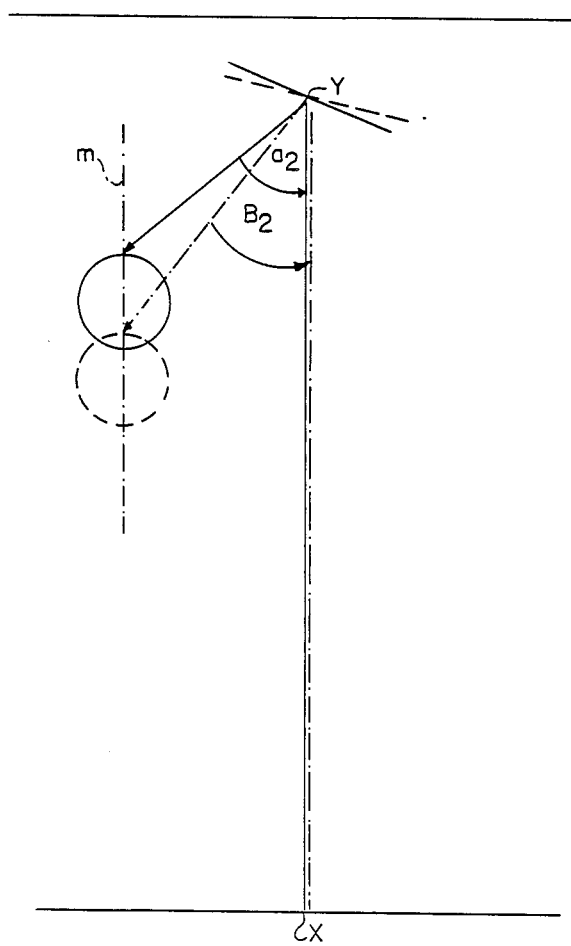

The relationship between the position of the eyes or the head of the vehicle-user and the adjustment of the rear (view) mirror is shown in FIGS. 3 and 4. FIG. 3 shows the relationship between the height position of the head or the eyes and the rotary position of the rear view mirror in relation to an axis parallel to the normal vector $V_N$ of the seat center plane m (FIG. 2). FIG. 4 illustrates the relationship between the longitudinal position and the rotary position of the rear view mirror in relation to an axis parallel to the vertical axis $V_H$ of the vehicle.

The windshield and the rear window are additionally shown in FIGS. 3 and 4. It can be seen clearly that the rotary position of the rear view mirror indicated, for example, by the angles $a_1$ and $b_1$ as well as $a_2$ and $b_2$ depends on the head or eye position of the driver. It is thus possible to unequivocally derive the eye position from the position of the inside rear view mirror.

Cross hairs (y) or the like may be additionally arranged as bearing means on the inside of the rear view mirror, coincident with the point of intersection of its two rotary axes, whereby the cross hairs are to be brought into alignment with a further marking (x) inside of the rear window. The further marking could be a point or the like. If this has taken place, then the rear view mirror is in the desired position with respect to the vehicle-user. Its adjusting parameters then again permit an unequivocal determination of the head or eye position of the vehicle-user—in conjunction with a furthe reference magnitude such as the position of the seat center plane m and the adjusting parameters of a further rear view mirror.

While I have shown and described several embodiments in accordance with the present invention, it is understood that the invention is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method for determining the eye and/or head position of a vehicle-user, comprising the steps of having the position of a rear view mirror of the vehicle being used characterized by adjusting parameters therefore, having said rear view mirror adjusted to a position of proper adjustment for the vehicle user, and then using the adjusting parameters characterizing the proper adjustment position to determine the eye and/or head position of the vehicle user.

2. A method according to claim 1, wherein the adjusting parameters of an inside rear view mirror are used.

3. A method according to claim 2, wherein the adjusting parameters of an outside rear view mirror are also used.

4. A method according to claim 1, wherein the adjusting parameters of an outside rear view mirror are used.

5. An apparatus for carrying out the method according to claim 1, comprising potentiometer means having two degrees of freedom coordinated to the rear view mirror, said potentiometer means being operable to detect the adjusting parameters of the rear view mirror.

6. An apparatus according to claim 5, further comprising marking means in the rear view mirror which is aligned with an associated marking means in a rear window of the vehicle being used when the rear view mirror is inside the vehicle being used and in proper adjustment.

* * * * *